July 13, 1965    J. N. LAWSON ETAL    3,193,966
BAIT CONTAINER
Filed Dec. 20, 1963

INVENTORS
JOEL N. LAWSON
MARVIN M. LAWSON
BY
Alfred R. Fuchs
ATTORNEY

United States Patent Office 3,193,966
Patented July 13, 1965

3,193,966
BAIT CONTAINER
Joel N. Lawson, 2705 S. 52nd St., and Marvin M. Lawson, 1723 S. 23rd St., both of Kansas City, Kans.
Filed Dec. 20, 1963, Ser. No. 332,207
5 Claims. (Cl. 43—55)

Our invention relates to containers for live bait, and more particularly to a container for live bait in which the bait is kept in a body of somewhat moist material, such as earth, and dispensed therefrom.

When earth worms or similar live bait, that must be kept in a body of moist material, such as earth, is to be used, it has been necessary to manually remove the earth worms or other similar bait, from the body of material in which the same are embedded, as the tendency of such bait is to bury itself in the body of material in which it is kept. In order to remove such live bait, it is necessary to dig in embedding material with the fingers or an instrument of some sort with which such digging can be done, or remove part of the earth or other embedding material in order to obtain access to the earth worms or other similar bait. It is a purpose of our invention to provide a bait container that is of such character that the live bait, such as earth worms, can be driven out of the material in which the same are buried to the surface thereof by a low voltage electric current so that there is no necessity of digging in the body of earth or similar material.

As it is desirable to only remove one such worm or other such piece of live bait at a time, means is provided for controlling the charging of the mass of embedding material electrically so that only the amount of live bait desired to be removed will travel to the surface of the embedding material upon one actuation of the controlling means.

More specifically it is a purpose of our invention to provide a container for a body of electrically conductive material adapted for the embedment of live bait therein, that is provided with a pair of electrically conductive wall portions that are insulated from each other electrically and to supply low voltage electric current of opposite polarity to the two wall portions in such a manner that the electric current will be conducted through the mass of conductive material in which the live bait is embedded so as to drive the bait to the surface of the embedding material. It is well known that the passage of electric current through the ground will react upon earth worms, in the area through which the electric current is passing, to cause the earth worms to come to the surface of the ground. Other bait that burrows in the ground is similarly affected. It has been customary to use the ordinary house current or other relatively high voltage current for this purpose, which always involved the danger of shock.

We have discovered that it does not require any high voltage current to dislodge the earth worms or other similar live bait from the body of earth or other similar material in which they are kept in the bait container. An ordinary nine volt dry battery provides a sufficient electrical charge to operate our improved bait container to force earth worms to the surface of the earth or other material contained therein. In view of the fact that such a low voltage current can be used for this purpose, we provide a metal container having a cylindrical wall portion with which one terminal of the battery is connected and having a transverse metallic wall portion forming a bottom for the bait chamber, which transverse wall is electrically insulated from the cylindrical wall portion. Due to the low voltage current utilized, the container can be held by the user, with his hand engaging the cylindricall wall, without any danger of shock.

It is another purpose of our invention to provide means for closing the circuit between the battery and one of the wall portions which is ordinarily known as a "momentary" switch, and which comprises switching means spring biased toward normally open circuit position so that the circuit will only be closed as long as the push button or other operating member is manually held in circuit closing position.

More specifically, our invention comprises a container that has an upper bait compartment and a lower compartment in which the battery for operating the same is contained, the wall separating said compartments serving as one of the terminals of the circuit supplying the electric current to the body of earth or similar material containing the live bait, and to means on said wall for detachably mounting the battery thereon.

Other objects and advantages of our invention will appear as the description of the drawings procceds. We desire to have it understood, however, that we do not intend to limit ourselves to the particular details shown or described, except as defined in the claims.

Figures 1, 2:
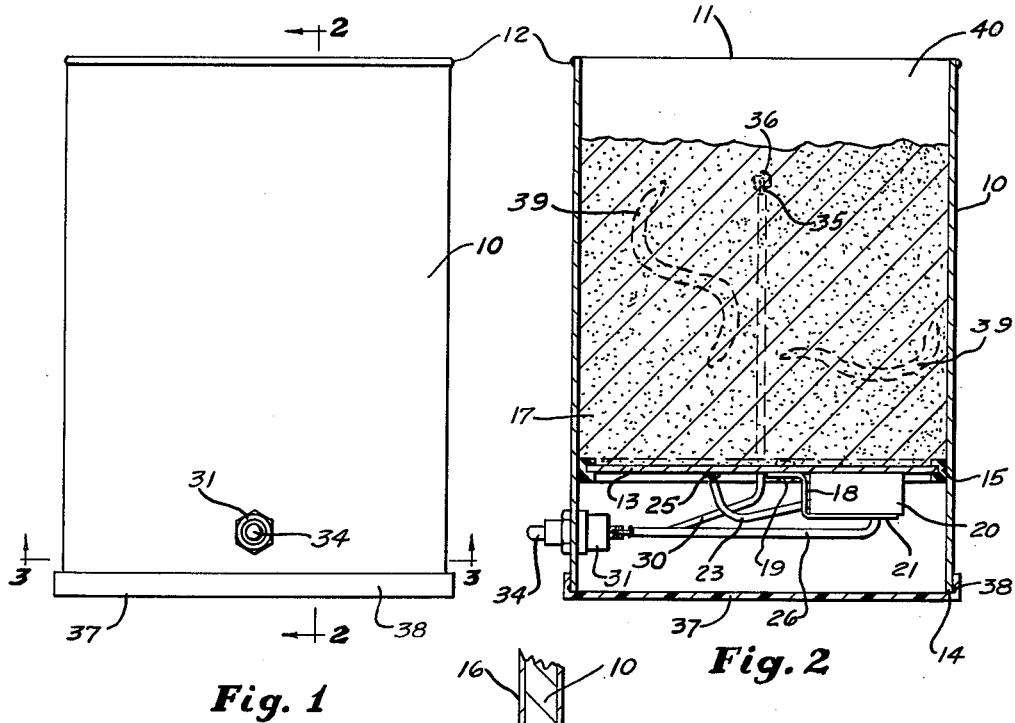
FIG. 1 is a side elevation of our improved bait container.
FIG. 2 is a vertical sectional view taken on the line 2—2 of FIG. 1, certain parts being shown in elevation.
Figure 5:
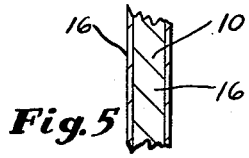
FIG. 5 is a fragmentary sectional view on a greatly enlarged scale of a portion of the cylindrical side wall of the bait container.

Referring in detail to the drawings, our improved bait container has a cylindrical body portion 10, which is preferably open at the upper end 11 thereof, and which may be provided with a bead at 12 at said end to stiffen the same. Mounted in said cylindrical body portion 10 is a transverse wall 13, which may be held in position in any desired manner, being shown as forced into position in spaced relation to both the top end 11 and the bottom end 14 of said body portion 10. A U-shaped in cross section ring of compressible electrical insulating material 15 embraces the peripheral edge of the wall 13 and is interposed between said transverse wall 13 and the metallic body portion 10 extending completely around the periphery of the wall 13. The wall 10 is preferably provided with a moisture resisting coating 16, such as galvanizing, and the transverse wall 13 is similarly provided with such a coating 16. Due to the fact that the body of earth or similar material 17 provided in the body portion 10 above the transverse wall 13 is preferably always somewhat moist, and due to the fact that the wall portion 10 and the wall portion 13 serve as opposite terminals of an electrical circuit, with which the somewhat moist material 17 is in contact, it is desirable to have a corrosion resisiting coating on the metal wall portions 10 and 13.

Figures 3, 6:
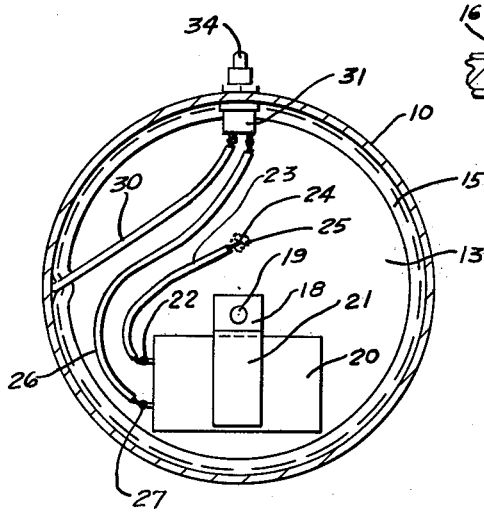
FIG. 3 is a section taken on the line 3—3 of FIG. 1.
FIG. 6 is a similar view of the transverse partition wall in the container.
Figure 4:
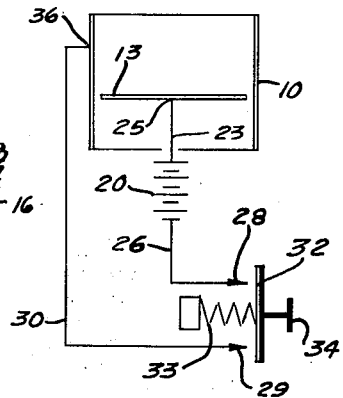
FIG. 4 is a diagrammatic view showing the electrical circuit employed.

The transverse wall portion 13 is preferably provided with a bracket 18, which may be secured thereto in any desired manner, as by means of a fastening element 19, and said bracket is preferably of somewhat springy material so that the nine volt battery 20 can be firmly held between the transverse portion 21 of said bracket and the under side of the transverse wall 13, it being obvious that the battery can be readily removed for replacement when this is necessary. One of the terminals 22 of said battery has an insulated conductor 23 extending therefrom to the transverse wall 13, the end 24 of said conductor being soldered to or otherwise electrically connected with the transverse wall 13 by means of a mass of solder or similar conductive material 25. An insulated conductor 26 extends from the other terminal 27 of the battery 20 to a stationary contact 28 of a "momentary" switch, which has a stationary contact 29 from which an insulated conductor 30 extends, said switch being indicated generally by the numeral 31, and being mounted in the body portion 10 of the bait container below the transverse partition wall 13, as shown in FIGS. 1, 2 and 3.

Said switch 31 is provided with a movable contact 32, which is normally held in spaced relation to the stationary contacts 28 and 29 by a spring 33 and which is adapted to be engaged with the contacts 28 and 29 to bridge the same by means of the operating member 34, which is shown as being a push button. The conductor 30 extends upwardly on the inner face of the wall portion 10 and has the end 35 thereof electrically connected with the wall portion 10, as by means of a body of solder 36, or similar electrically conducting connection, in upwardly spaced relation to said transverse wall 13.

The bottom end of the body portion 10 is preferably closed by means of a removable closure member 37, which may be of electrical insulating material, and which is provided with a flange 38 that engages around the bottom end 14 of the cylindrical wall 10.

Assuming that the body of bait embedding material 17 is moist earth or similar moistened or electrically conducting material and that a number of worms or other live bait is embedded in said body portion, such worms being indicated at 39 in FIG. 2, and it is desired to remove one of said worms 39 from said embedding material 17, all that is necessary is to push on the push button 34 of the switch 31 for an interval long enough for one of the worms or other bait 39 to travel upwardly out of the body of embedding material 17 into the portion 40 of the container above said body of material 17. It is desirable to then immediately release the push button to permit the switch to reopen, as it is not desirable to subject the live bait to the electric current continuously, it being desirable to keep the bait in its embedded condition in the body of material 10 and to not submit the bait to a continuous electrical current, which might prove harmful to some types of bait for which the apparatus can be used.

What we claim is:

1. A container for a body of electrically conductive material adapted for the embedment of live bait therein comprising a cylindrical metal body portion, a transverse metal wall mounted in said body portion between the ends thereof to divide said body portion into an upper chamber and a lower chamber, a compressible electrical insulating member U-shaped in cross section extending around and embracing the peripheral edge of said transverse wall clamped between said transverse wall and said cylindrical body portion to insulate said transverse wall and said body portion from each other, said upper chamber being adapted to contain said material for embedment of said bait, a source of low voltage direct current in said lower chamber and means for momentarily connecting the terminals of said source with said body portion and said transverse wall including switching means biased toward normally open position.

2. A container for a body of electrically conductive material adapted for the embedment of live bait therein comprising a cylindrical metal body portion, a transverse metal wall mounted in said body portion between the ends thereof to divide said body portion into an upper chamber and a lower chamber, a compressible electrical insulating member extending around and embracing the peripheral edge of said transverse wall clamped between said transverse wall and said cylindrical body portion to insulate said transverse wall and said body portion from each other, said upper chamber being adapted to contain said material for embedment of said bait, a spring clip mounted on the under side of said transverse wall, an electrically battery engaged by said clip to mount said battery in said lower chamber and means for electrically connecting one terminal of said battery with said transverse wall and the other terminal of said battery with said body portion near the upper end thereof, said means including a switch normally spring biased toward open circuit position and push button means mounted on said cylindrical body portion for manually momentarily holding said switch in closed circuit position.

3. A container for a body of electrically conductive material adapted for the embedment of live bait therein comprising a cylindrical metal body portion, a transverse metal wall mounted in said body portion between the ends thereof to divide said body portion into an upper chamber and a lower chamber, said body portion and transverse wall being provided with a rust resistant electrically conductive surface coating, a compressible electrical insulating member extending around and embracing the peripheral edge of said transverse wall clamped between said transverse wall and said cylindrical body portion to insulate said transverse wall and said body portion from each other, said upper chamber being adapted to contain said material for embedment of said bait, a spring clip mounted on the under side of said transverse wall, an electrical battery engaged by said clip to mount said battery in said lower chamber and means for electrically connecting one terminal of said battery with said transverse wall and the other terminal of said battery with said body portion near the upper end thereof, said means including a switch normally spring biased toward open circuit position and push button means mounted on said cylindrical body portion for manually momentarily holding said switch in closed circuit position.

4. A bait carrier comprising an open topped chamber for a body of moist earth adapted to have live bait embedded therein, said chamber having a body portion comprising an upstanding electric current conducting annular metallic side wall and a transversely extending electrical current conducting metallic wall forming the bottom of said chamber, said transversely extending wall having its periphery adjacent said upstanding side wall, a compressible insulating member U-shaped in cross section mounted on the periphery of said transversely extending wall and extending around the same between said periphery of said wall and said side wall to insulate said walls from each other, a source of low voltage electric current having terminals of opposite polarity mounted in said bait carrier, and means for momentarily connecting said terminals with said walls including manually operated switching means biased toward normally open circuit position on said bait carrier.

5. A bait carrier comprising an open topped chamber for a body of moist earth adapted to have live bait embedded therein, said chamber having a body portion comprising an upstanding electric current conducting annular metallic side wall and a transversely extending electrical current conducting metallic wall forming the bottom of said chamber, said transversely extending wall being spaced upwardly from the bottom edge of said side wall to provide a lower annular side wall portion extending downwardly below said transversely extending wall to provide a lower chamber below said open topped chamber, said transversely extending wall having its periphery adjacent said upstanding side wall, a compressible insulating member U-shaped in cross section mounted on the periphery of said transversely extending wall and extending around the same between said periphery of said wall and said side wall to insulate said walls from each other, a bottom wall detachably secured to the bottom edge of said side wall to close said lower chamber, a low voltage electrical battery detachably mounted on the under side of said transversely extending wall within said lower chamber, and means for momentarily connecting its terminals with said walls including manually operated switching means biased toward normally open circuit position on said lower side wall below said transverse wall.

References Cited by the Examiner

UNITED STATES PATENTS

| | | | |
|---|---|---|---|
| 1,194,079 | 8/16 | Schack | 43—99 |
| 2,257,879 | 10/41 | Graham | 43—55 |
| 2,507,319 | 5/50 | Peters | 43—55 |
| 2,607,164 | 8/52 | Fenton. | |

FOREIGN PATENTS

| | | |
|---|---|---|
| 909,644 | 4/54 | Germany. |
| 382,669 | 10/32 | Great Britain. |

ABRAHAM G. STONE, *Primary Examiner.*